Nov. 4, 1924.                                                      1514,438
C. C. COCHRAN
AUTO BRAKE
Filed March 24, 1923

Inventor
C. C. Cochran,
By
Attorney

Patented Nov. 4, 1924.

1,514,438

UNITED STATES PATENT OFFICE.

CLARENCE C. COCHRAN, OF OHLEY, WEST VIRGINIA.

AUTO BRAKE.

Application filed March 24, 1923. Serial No. 627,481.

*To all whom it may concern:*

Be it known that I, CLARENCE C. COCHRAN, a citizen of the United States, residing at Ohley, in the county of Kanawha and State of West Virginia, have invented certain new and useful Improvements in Auto Brakes; and I do hereby declare the following to be a full, clear, and exact description of the invention, such as will enable others skilled in the art to which it appertains to make and use the same.

This invention relates to an automobile braking mechanism.

It is particularly aimed to provide a novel structure permitting expeditious removal of the brake band without necessitating removal of the wheel carrying the drum associated with such band, and particularly in the case of automobiles or self-propelled vehicles.

Additional objects and advantages will be pointed out as the description progresses and otherwise become apparent from a consideration thereof.

An operative embodiment is illustrated in accompanying drawings in which:—

Like reference characters designate like or similar parts in the different views.

Figure 1:
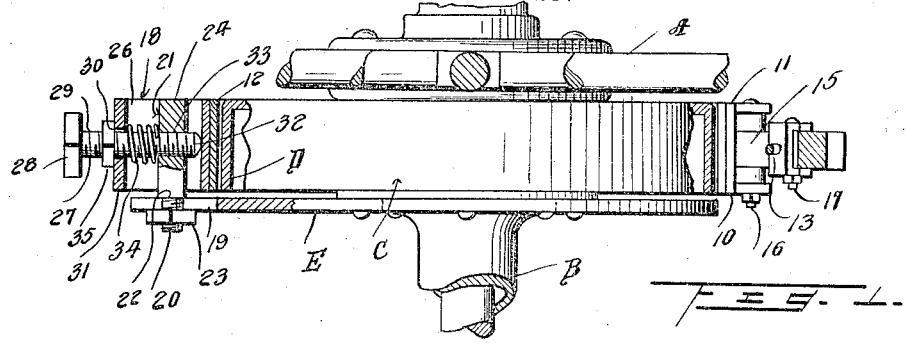
Figure 1 is a view illustrating the invention substantially in central horizontal section, in connection with fragmentary automobile parts.
Figure 2:
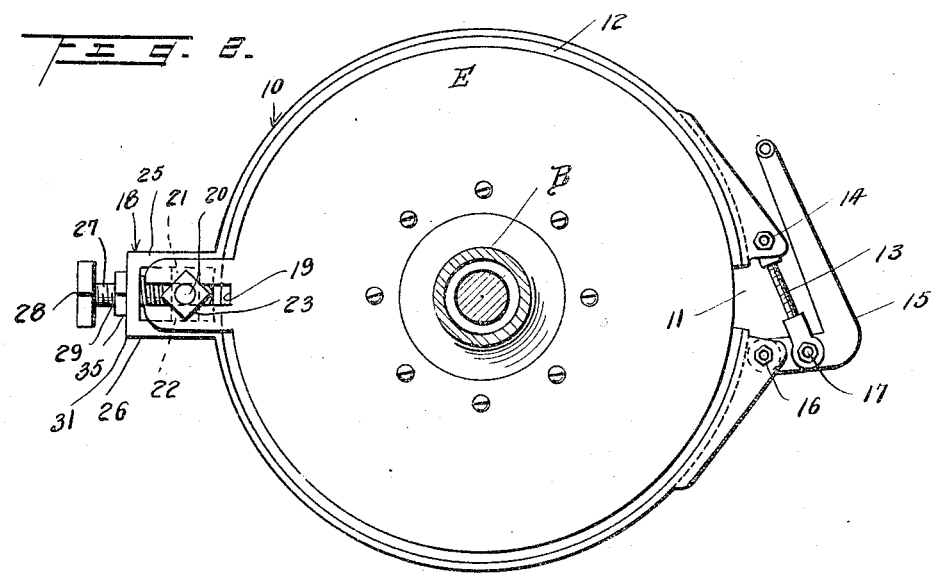
Figure 2 is a side elevation of said parts.
Figure 3:
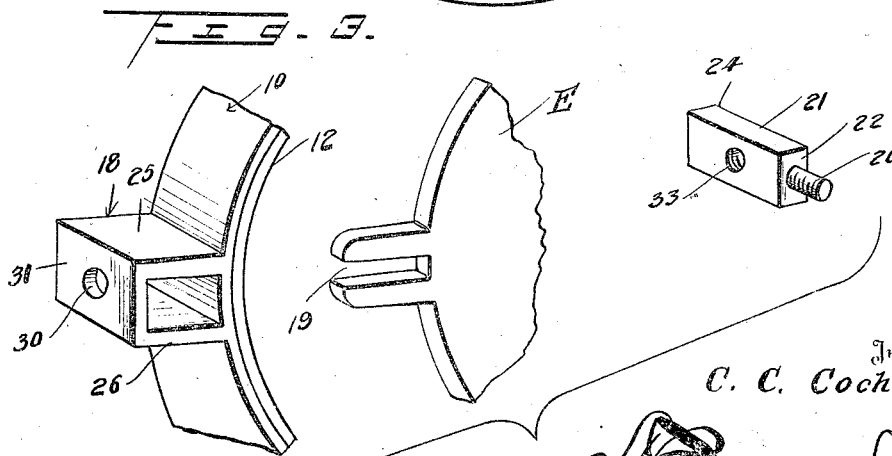
Figure 3 is a view showing the novel parts in perspective and disassociated.

The invention is practiced in connection with a vehicle wheel A of any suitable type, usually an automobile rear wheel which is positively driven by a rear axle and suitable mechanism contained in a housing B. A suitable brake drum C is rigidly attached against the inner surface of the wheel A and has a laterally and inwardly extending shoe-engaging flange D. The wheel A and drum C rotate with respect to a disk or plate E which is stationary and secured in any suitable manner to the stationary housing B.

The brake band is one piece of substantially ring form as at 10, being of flexible metal and split at one point, for instance the front thereof as shown at 11. Band 10 is preferably lined as at 12 with leather, textile material or otherwise to form a shoe to directly engage the exterior surface of the flange D.

Any suitable means may be utilized to contract the band 10 about the flange D and thus impart braking action thereto. For instance a toggle bolt 13 may be pivoted at 14 to band 10 on one side of the split while a toggle lever 15 may be pivoted as at 16 to said band 10 on the other side of the split. Bolt 13 and lever 15 are pivoted together at 17. As will be realized the lever 15 is connected to the usual brake lever of an automobile or the like. The pivots 14, 16 and 17 may be bolts as shown so that they may be readily removed and replaced.

Offset on the band 10 diametrically opposite to the split 11 is a bracket 18. The disk E has an elongated slot 19 therethrough open at one end and in which a reduced shank 20 of a fastening bolt 21 may be disposed. The shank 20 is fastened in adjusted position in the slot 19 by the engagement of a shoulder at 22 against one side of the disk and the engagement of a nut 23, threaded on the shank 20, against the opposite side of the disk. Bolt 21 has a rectangular head 24 extending into the bracket 18 and at its upper and lower surfaces being in engagement with the upper and lower walls 25 and 26 of the bracket and which are arranged in parallelism so that the bracket may slide on said head 24 but be incapable of turning movement with respect thereto.

A band-regulating element is provided in the form of a set screw 27. This screw has a head 28 from which a shank 29 extends. Shank 29 passes loosely through an opening 30 in the transverse wall 31 of housing 18 and such shank has screw threads at 32 which are in engagement with screw threads in an opening 33 provided in head 24. Thus through movement of the screw 27 in opposite directions, it will accordingly, as it bears against the band 10, control the normal position of that band. Coil spring 34 surrounds shank 29 intermediate head 24 and wall 31, tending to move the band 10 out of engagement with the flange. A lock nut 35 may be threaded to the shank 29.

In use, the band is contracted about the exterior of flange D through operation of the lever 15 in combination with toggle 13. When the pressure on lever 15 is released, the spring 34 will urge the band at the portion opposite to split 11, away from the flange D. Should it be desired to remove the band 10 as for inspection, repair or the like, the nut 23 is loosened which will enable the bolt 22 to disengage slot 19. Thereafter one of the bolts 16 or 17 may be removed and the band spread so as to permit its withdrawal diametrically of the drum C or the housing B. If desired both bolts 14 and 16 may be removed for this purpose. It will thus be realized that the band 10 is removable independently of the wheel A which reduces labor to a very considerable extent.

Changes may be made within the spirit and scope of the invention.

I claim as my invention:—

1. In a brake mechanism, a drum adapted for rotation, a part adapted to remain stationary relatively to the drum, a band to engage said drum, a bracket on said band, a bolt having a head extending into the bracket and relatively to which the bracket slides, a screw extending into the bracket and threaded to said head and engaging said band, and said part having a slot detachably engaged by said bolt.

2. In a braking mechanism, a drum adapted for rotation, a disk adapted for stationary disposition, a band coacting with said drum, a bracket offset on said band, a bolt having a head nonrotatably extending into the bracket, said bracket being slidable relatively to said head, a set screw extending into the bracket and engaging said band, said set screw being threaded to said head, an expansive spring surrounding said set screw and engaging said head at one end of said bracket, said bolt having a reduced shank, said disk having an elongated slot open at one end and in which said shank is disposed, and a nut on said shank.

In testimony whereof I affix my signature in presence of two witnesses.

CLARENCE C. COCHRAN.

Witnesses:
 FRANK HARRIS,
 MARGIE HARRIS.